(12) United States Patent
Lauer

(10) Patent No.: US 12,473,049 B2
(45) Date of Patent: Nov. 18, 2025

(54) BICYCLE PEDAL WITH PINS WITH SKEWED TEETH

(71) Applicant: Sport Import GmbH, Edewecht (DE)

(72) Inventor: Swen Lauer, Garmisch-Partenkirchen (DE)

(73) Assignee: Sport Import GmbH, Edewecht (DE)

( * ) Notice: Subject to any disclaimer, the term of this patent is extended or adjusted under 35 U.S.C. 154(b) by 0 days.

(21) Appl. No.: 18/736,576

(22) Filed: Jun. 7, 2024

(65) Prior Publication Data

US 2024/0359768 A1 Oct. 31, 2024

Related U.S. Application Data

(63) Continuation of application No. PCT/EP2022/084489, filed on Dec. 6, 2022.

(30) Foreign Application Priority Data

Dec. 7, 2021 (DE) .......................... 102021213914.0

(51) Int. Cl.
 *B62M 3/08* (2006.01)
(52) U.S. Cl.
 CPC ................... *B62M 3/086* (2013.01)
(58) Field of Classification Search
 CPC ............................... B62M 3/086; B62M 3/10
 USPC ........................................................ 74/594.4
 See application file for complete search history.

(56) References Cited

U.S. PATENT DOCUMENTS

| 8,714,052 | B2 | 5/2014 | Chamberlain | |
| D915,246 | S | 4/2021 | Tsai | |
| 2006/0266154 | A1* | 11/2006 | Hermansen | B62M 3/08 |
| | | | | 74/594.6 |
| 2009/0095122 | A1* | 4/2009 | Weagle | B62M 3/08 |
| | | | | 74/560 |
| 2012/0291590 | A1 | 11/2012 | Chamberlain | |
| 2022/0106009 | A1* | 4/2022 | Inoue | B62M 3/08 |
| 2023/0142490 | A1* | 5/2023 | Marui | B62M 3/08 |
| | | | | 74/594.6 |

FOREIGN PATENT DOCUMENTS

| CN | 213502776 U | 6/2021 |
| DE | 1475051 C | 1/1971 |
| DE | 69612818 T2 | 12/2001 |
| DE | 202005004085 U1 | 5/2005 |

(Continued)

OTHER PUBLICATIONS

Translation of DE-202011003213-U1, Dominik, Jul. 14, 2011 (Year: 2011).*

(Continued)

*Primary Examiner* — Robert A. Siconolfi
(74) *Attorney, Agent, or Firm* — PV IP PC; Wei Te Chung; Christopher S. Ruprecht

(57) ABSTRACT

A bicycle pedal includes a pedal body with a first contact surface and an opposite second contact surface, a plurality of pins is arranged on the first contact surface, and a plurality of pins is arranged on the second contact surface. At least one of the pins has a tooth with a skew relative to the respective contact surface of the bicycle pedal, the skew of the tooth has an angle α of between α=5° and α=45° with respect to a perpendicular to the respective contact surface, on which the pin is mounted.

21 Claims, 9 Drawing Sheets

(56) References Cited

FOREIGN PATENT DOCUMENTS

DE      202011003213 U1 *   7/2011   .............. B62M 3/08
DE      202019103183 U1     6/2019
EP          2778440 A1      9/2014

OTHER PUBLICATIONS

German Office Action issued in corresponding Chinese Patent Application No. 102021213914.0 dated Sep. 22, 2022, pp. 1-5.
International Search Report in International application No. PCT/EP2022/084489, mailed on Mar. 24, 2023.
Written Opinion of the International Search Authority in International application No. PCT/EP2022/084489, mailed on Mar. 24, 2023.

* cited by examiner

BICYCLE PEDAL WITH PINS WITH SKEWED TEETH

CROSS-REFERENCES TO RELATED APPLICATIONS

This application is a continuation of copending International Application No. PCT/EP2022/084489, filed Dec. 6, 2022, which is incorporated herein by reference in its entirety, and additionally claims priority from German Application No. 102021213914.0, filed Dec. 7, 2021, which is also incorporated herein by reference in its entirety.

TECHNICAL FIELD

The invention described herein relates to a bicycle pedal with at least one pin that is skewed relative to the contact surface of the pedal. Furthermore, the present invention relates to such a pin that can be mounted on a bicycle pedal in a replaceable manner.

BACKGROUND OF THE INVENTION

Bicycles driven by means of a crank comprise a bicycle pedal that is affixed to the crank. While riding, the feet, or shoes, of the cyclist rest on the pedals. Especially in the case of mountain bikes, which are usually moved through partially impassable or rough terrain, it is important for the cyclist to have a proper grip on the pedal.

This grip may be established by the cyclist using so-called click pedals or click-in pedals or step-in pedals or clipless pedals. In this case, the cyclist, while riding, clicks into a biased spring mechanism mounted in the pedal, using a so-called cleat mounted in the sole of the shoe. This offers a force-fit, and therefore very good, contact between the shoe and the pedal. For many cyclists, however, this is unfamiliar and uncomfortable as the shoe is fixed in the pedal in a fixedly predefined position, which diminishes the movability. Additionally, for clicking out of the pedal, the foot has to be twisted in an unnatural and unintuitive movement, which may also be uncomfortable for the cyclist. Moreover, it often occurs that a cyclist, upon stopping, does not release from the clipless pedal in time and consequently falls along with the bike.

As an alternative to the above-described clipless pedals, there are so-called platform pedals. The pedal body of such a platform pedal comprises a standing area or contact surface on each of the top and bottom sides, on which the cyclist can stand with their shoes while riding. To improve the grip, these pedals comprise a plurality of pins on both contact surfaces. These are thin metal pins which can be screwed vertically into the pedal body and, in the screwed-in state, project from the respective contact surface. These pins projecting vertically from the respective contact surface then bore into the shoe sole of the cyclist. This causes the show to remain stable on the pedal. However, this is only true for movements in the direction of travel, against the direction of travel, as well as laterally outwards. This means that the pins offer a relatively good grip for the shoe on the pedal and are able to secure the shoe against slipping to the front, to the back and laterally outwards. However, this is only true within certain limits as, particularly in rough terrain or when jumping, it is possible that the shoe loses contact with the pins, causing the cyclist to slip off the pedal. This may lead to injuries, particularly in the area of the shins.

Thus, it would be desirable to increase the grip of platform pedals with pins to offer the cyclist a better and safer standing on the contact surfaces of the pedals.

SUMMARY

According to an embodiment, a bicycle pedal may have: a pedal body with a first contact surface and an opposite second contact surface, wherein a plurality of pins is arranged on the first contact surface, and wherein a plurality of pins is arranged on the second contact surface, wherein at least one of the pins comprises a tooth comprising a skew relative to the respective contact surface of the bicycle pedal, wherein the skew of the tooth comprises an angle of between $\alpha=5°$ and $\alpha=450$ with respect to a perpendicular to the respective contact surface, on which the pin is mounted.

Another embodiment may have a replaceable pin for a bicycle pedal, wherein the pin comprises a mounting plate, by means of which the pin is mountable on a contact surface of the bicycle pedal, wherein the pin comprises at least one tooth, wherein the tooth is arranged on the mounting plate such that the tooth comprises a skew relative to the contact surface of the bicycle pedal when the pin is mounted on the bicycle pedal, and wherein the skew of the tooth comprises an angle of between $\alpha=5°$ and $\alpha=45°$ with respect to the perpendicular to the respective contact surface of the bicycle pedal.

The inventive bicycle pedal comprises a pedal body with a first contact surface and an opposite second contact surface. A plurality of pins is arranged both on the first contact surface and on the second contact surface. The inventive pedal can therefore be categorized as a platform pedal. According to the invention, at least one of these pins comprises a tooth that is skewed relative to the respective contact surface of the bicycle pedal. The skew of the tooth comprises an angle of between 5° and 45° with respect to a perpendicular to the respective contact surface on which the pin is mounted. This means that the inventive pin comprises at least one tooth projecting from the contact surface of the pedal. However, the tooth does not project out of the respective contact surface perpendicular to the same, but the tooth projects obliquely or slanted from the contact surface of the pedal and is tilted by 5° to 45° with respect to a perpendicular to the contact surface. This corresponds to an angle of 45° to 85° with respect to the contact surface of the pedal. This skewed tooth can engage with the shoe sole significantly better than a conventional pin projecting vertically from the contact surface. The inventive skewed tooth can therefore also fasten the shoe significantly better in the corresponding opposite direction than a conventional vertical pin. When, e.g., the tooth is oriented forwards in the direction of travel and therefore penetrates the shoe sole obliquely forwards, then the shoe is secured particularly effectively against slipping backwards. When, in contrast, the tooth is oriented backwards in the direction of travel and therefore penetrates the shoe sole obliquely backwards, then the shoe is secured particularly effectively against slipping forwards. The same applies for securing against slipping outwards. This means that, when the tooth is oriented, for example, inwards, i.e., in the direction of the bicycle frame, it penetrates the shoe sole laterally inwards, whereby the shoe can be secured particularly effectively against slipping outwards. Conventional pins, however, are screwed vertically into the pedal body, so that they project vertically upwards out of the respective contact surface. They therefore penetrate the shoe sole vertically, i.e., in a straight direction from the bottom upwards, and therefore can only secure the shoe against slipping in a certain direction within a limited range.

A further aspect of the invention relates to a replaceable pin for a bicycle pedal. The pin comprises a mounting plate by means of which the pin can be mounted on a contact surface of the bicycle pedal. According to the invention, the pin comprises at least one skewed tooth. This means that the tooth is arranged on the mounting plate, such that the tooth comprises a skew relative to the contact surface of the bicycle pedal when the pin is mounted on the bicycle pedal. The skew of the tooth comprises an angle of between 5° and 45° with respect to a perpendicular to the contact surface of the bicycle pedal. This means that the pin is arranged so not to be vertical, but skewed relative to the contact surface, being tilted by 5° to 45° with respect to a perpendicular to the contact surface. This corresponds to an angle of 45° to 85° with respect to a perpendicular to the contact surface.

The inventive pin may be arranged on both contact surfaces of the pedal. Moreover, the pin is replaceable, so that it may be replaced simply and quickly in case of breakage or loss of the skewed tooth.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
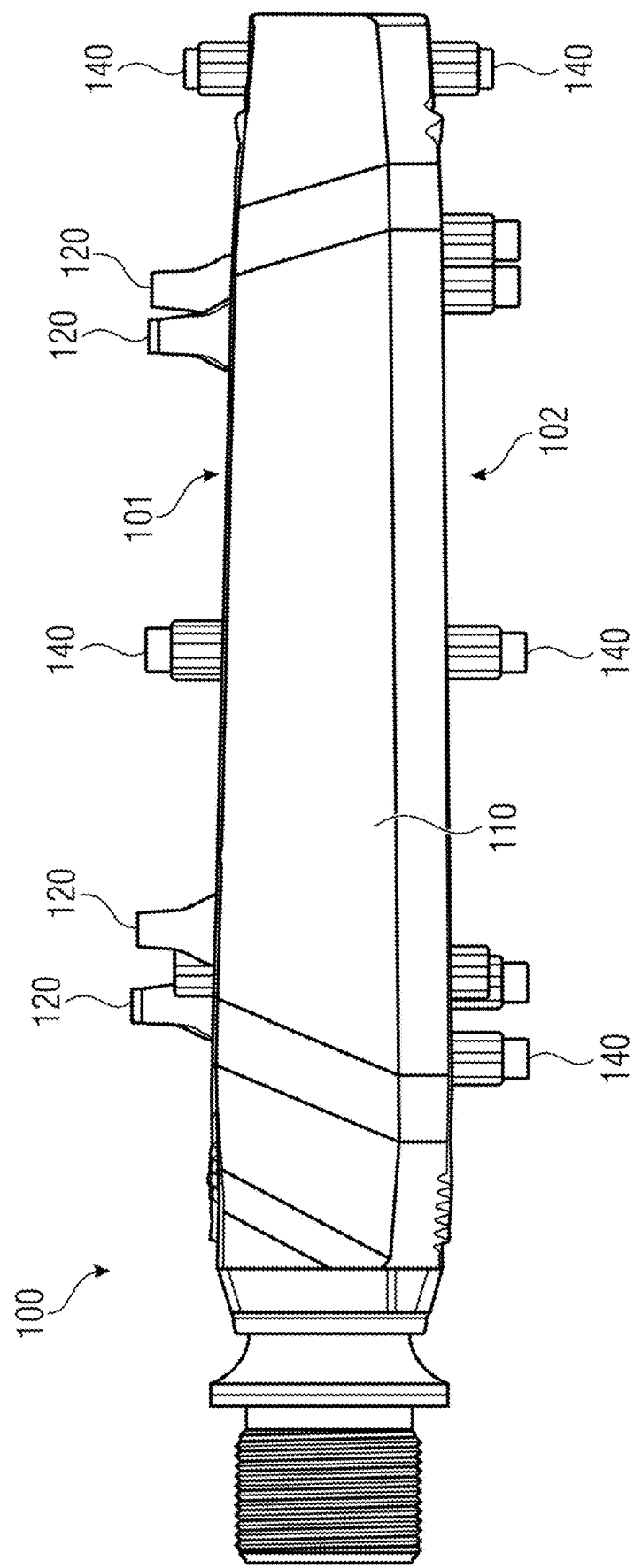
FIG. 1 shows a side view of a bicycle pedal with inventive pins according to an embodiment.

In the following, embodiments are described in more detail with reference to the drawings, wherein elements with the same or similar functions are provided with the same reference numerals.

Method steps represented or described in the context of the present disclosure may also be carried out in a sequence that differs from the represented or described sequence. In addition, method steps concerning a specific feature of an apparatus are interchangeable with said feature of the apparatus, and vice versa.

When a bicycle is mentioned in this disclosure, this refers particularly to a two-wheeled vehicle driven by a crank, on which, in turn, a corresponding pedal can be attached. The term of bicycle, however, also encompasses unicycles, tricycles, as well as vehicles with four or more wheels, which can each be driven using a crank and a pedal.

Figure 2:
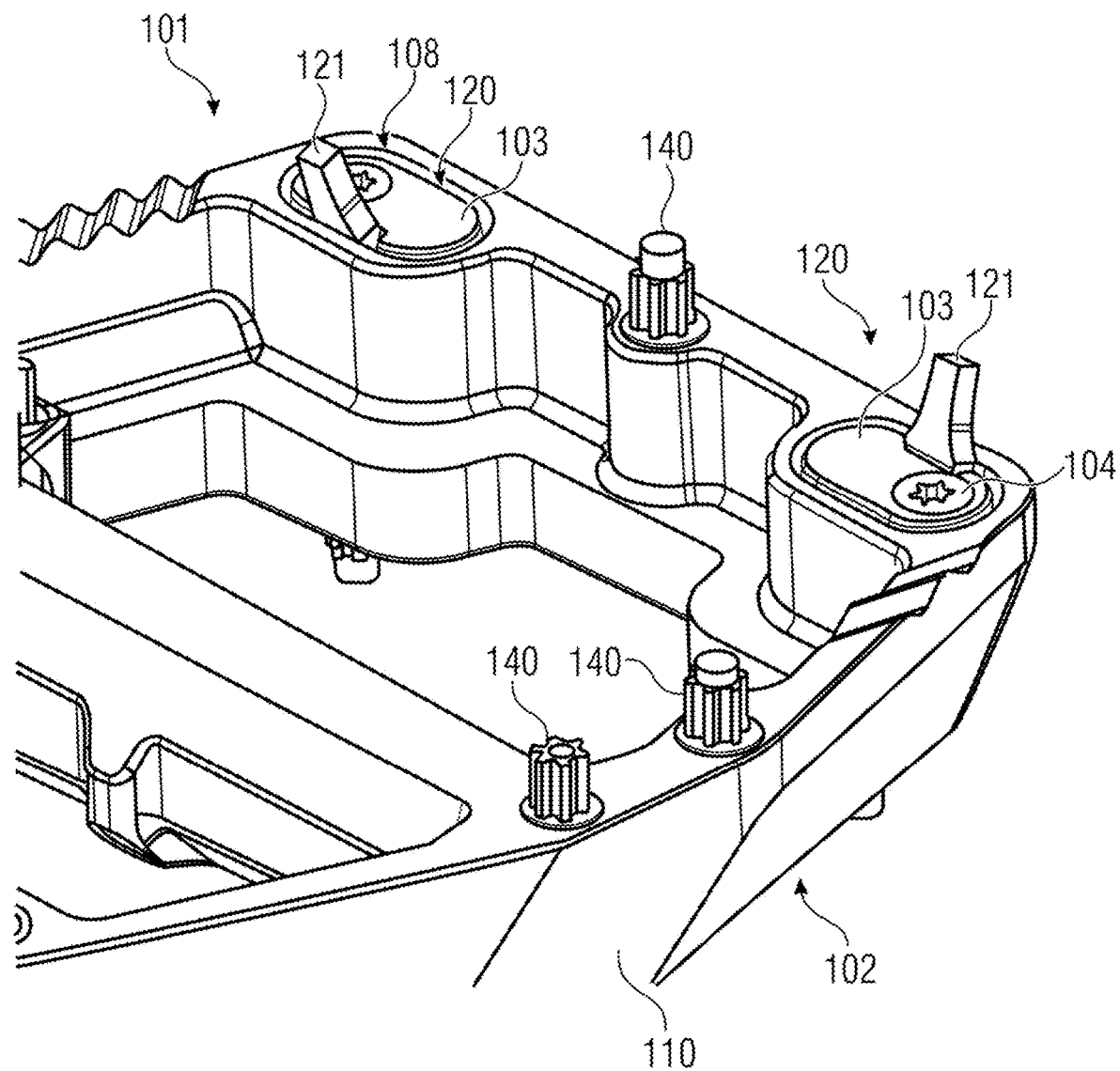
FIG. 2 shows a detailed view of a contact surface of the bicycle pedal of FIG. 1.

The innovative concept of the skewed pins described herein is first to be discussed with reference to FIGS. 1 and 2. FIG. 2 shows a side view of a bicycle pedal 100, and FIG. 2 shows an enlarged cutout of a contact surface 101 of the bicycle pedal 100 in a perspective view.

The bicycle pedal 100 is to be categorized as a platform pedal, which is also referred to as a flat pedal. The bicycle pedal 100 comprises a pedal body 110. The pedal body 110 comprises a first contact surface 101 and an opposite second contact surface 102.

Both on the first contact surface 101 and on the second contact surface 102, a plurality of pins is arranged. These may be conventional pins 140 that are screwed vertically into the respective contact surface 101, 102 and project vertically out of the contact surface 101, 102.

However, at least one of the pins in the bicycle pedal 100 is formed as an inventive pin 120. The inventive pin 120 may thus be affixed to a bicycle pedal 100 as an alternative or in addition to one or multiple conventional pins 140.

In the perspective view in FIG. 2, the geometry of the inventive pins 120 is well-discernible. While the conventional pins 140 project vertically out of the respective contact surface 101, 102, the inventive pin 120 comprises a tooth 121 that is oriented obliquely to the respective contact surface 101, 102. If the pedal 100 depicted in FIG. 2 was mounted on the right side of a bicycle, e.g., the pin 120 shown in the bottom right would comprise a tooth 121 that would be tilted forwards in the direction of travel (see arrow 133 in FIG. 3), and the pin 120 shown in the top left would comprise a tooth 121 that would be tilted backwards in the direction of travel 133.

Figure 3:
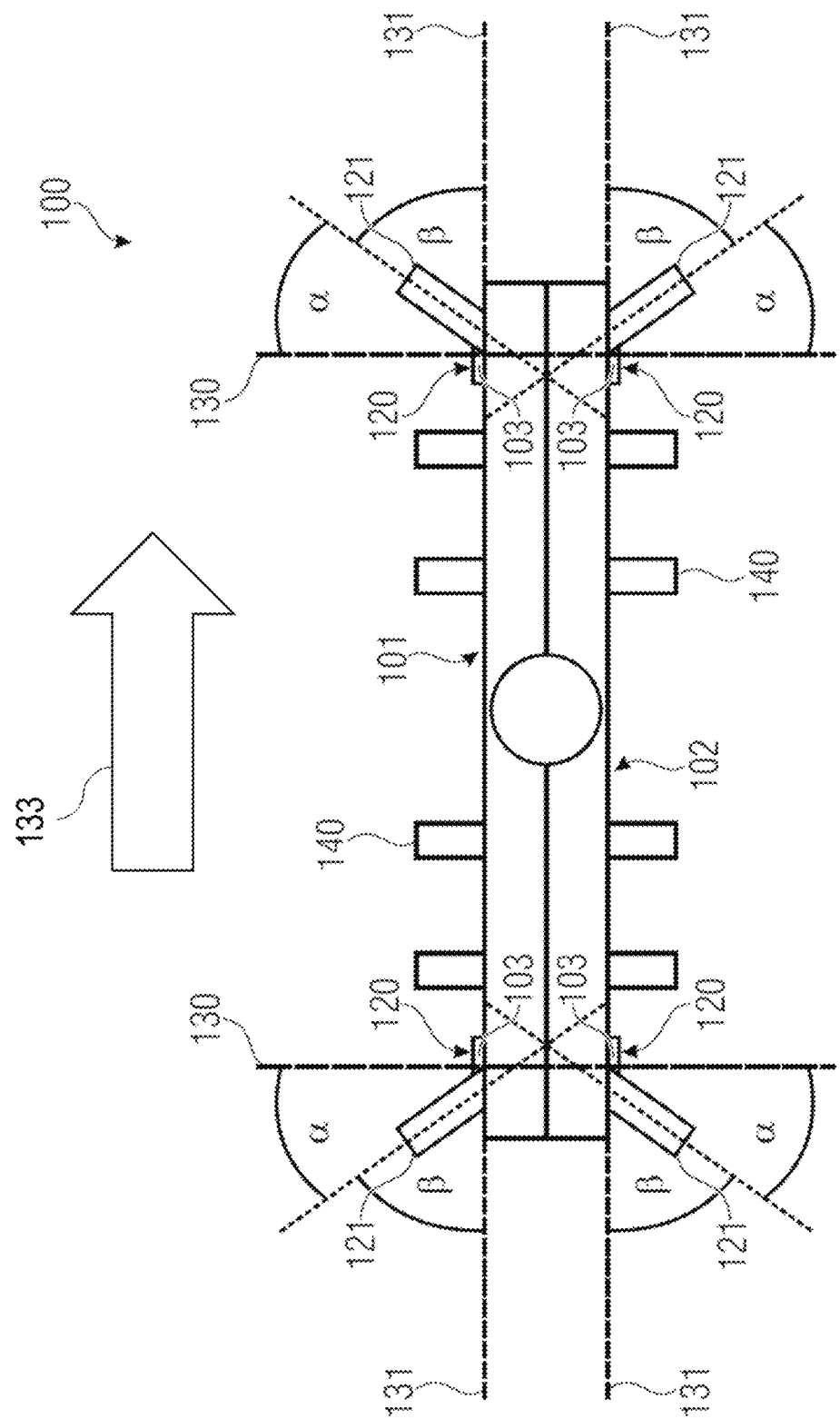
FIG. 3 shows a front view of a bicycle pedal with multiple pins with skewed teeth, according to an embodiment.

This inclination or skew of the tooth 121 relative to the contact surface 101, 102 of the pedal body 110 is to be discussed in further detail with reference to FIG. 3. FIG. 3 shows a front view of an inventive pedal 100 with a first contact surface 101 and an opposite second contact surface 102, wherein each contact surface 101, 102 comprises a plurality of pins 120, 140.

Purely by way of example, two inventive pins 120 on the first contact surface 101 and two inventive pins 120 on the second contact surface 102 are shown here. Each pin 120 comprises a tooth 121, which is tilted relative to the respective contact surface 101, 102, on which the respective pin 120 is mounted. Each tooth 121 therefore comprises an inclination or tilt relative to the respective contact surface 101, 102.

The inclination or skew of a tooth 121 comprises an angle $\alpha$ with respect to a perpendicular 130 to the respective contact surface 101, 102, on which the respective pin 120 is mounted. The value of the angle of inclination $\alpha$ amounts to between 5° and 45°, i.e., 5° $\leq \alpha \leq$ 45°. The sign of the angle of inclination $\alpha$, i.e., the direction of inclination, shall be disregarded for now.

Alternatively, the angle of inclination could also be expressed by the angle $\beta$ that is complementary to the angle $\alpha$. The angle of inclination $\beta$ is calculated according to a parallel 131 to the respective contact surface 101, 102. Accordingly, in this case, the angle of inclination $\beta$ would comprise a value of between 45° and 85°, i.e., 45°≤β≤85°. Here, as well, the sign of the angle of inclination β, i.e., the direction of inclination, shall be disregarded.

If the pedal 100 depicted in FIG. 3 was mounted on the right side of a bicycle, for example, the two pins 120 shown on the right would each comprise a tooth 121 which would be inclined forwards in the direction of travel, whereas the two pins 120 shown on the left would comprise a tooth 121 which would be inclined backwards in the direction of travel. Here in FIG. 3 the direction of travel is depicted by means of arrow 133.

The teeth 121 inclined forwards penetrate the shoe soles of the cyclist obliquely forwards. They correspondingly wedge into the shoe sole and thus effectively keep the shoe from slipping backwards in an undesired manner. The teeth 121 inclined backwards penetrate the shoe soles of a cyclist obliquely backwards and become wedged there in order to thus effectively keep the shoe from slipping forwards in an undesired manner.

A further essential advantage over the conventional vertical pins 140 consists in that the inventive skewed toothing 121 additionally causes the shoe to be effectively secured against lifting upwards off the pedal in an undesired manner. The conventional vertical pins 140 only offer lateral counterforces, i.e., the show is only secured against lateral slipping (forwards, backwards, to the side). However, the show can easily be lifted upwards.

Due to the inventive skewed toothing 121 becoming wedged in the shoe soles as described above, however, the inventive pins 120 offer not only lateral counterforces but also vertical counterforces, i.e., the shoe is secured both against lateral slipping (forwards, backwards, to the side) and against vertical slipping (upwards). Thus, the pedals 100 equipped with the inventive pins 120 offer a significantly better grip compared to conventional platform pedals with vertical pins.

Purely for the sake of completeness, it is noted here that efforts have been made in the conventional technology to screw straight or vertical pins 140 obliquely into the contact surfaces 101, 102. For this purpose, skewed threaded holes were introduced into the pedal body 110, and the conventional straight pins 140 were screwed in these skewed threaded holes. However, in practice, it was found that inserting the pins 140 into the skewed threaded holes is very problematic. The pins 140, of course, have to be screwed in with the exact same angle of inclination that is given by the skewed threaded hole. This means that, when the threaded hole is cut into the pedal body 110 with an angle of inclination of 10°, the pins 140 may also be screwed in with a 10° angle. This skewed positioning of the pins 140, however, is very unfamiliar for many users, which is why there have been many cases of users accidentally positioning the pins 140 with a wrong angle, often causing the threads to be destroyed. Additionally, the angle of inclination is not variable. As soon as a threaded hole is cut into the pedal body 110 with a certain angle of inclination, this angle of inclination can no longer be changed.

The present invention circumvents all these problems. The inventive pin 120 described herein comprises a mounting plate 103 (FIG. 2), by means of which the pin 102 can be mounted on the first or second contact surface 101, 102 of the pedal body 110. In this case, the tooth 121 is arranged at the outer circumference of the mounting plate 103. The mounting plate 103 lies flat on the respective contact surface 101, 102 of the bicycle pedal 100, so that the mounting plate 103 is oriented in parallel with the respective contact surface 101, 102. This is furthermore also depicted in FIG. 3.

The mounting plate 103 is thus parallel to the contact surface 101, 102, and can therefore be placed onto the respective contact surface 101, 102 in a plane parallel manner. Here, the tooth 121 is arranged on the mounting plate 103 with said skew with the angle of inclination of 5°≤α≤45°. This means that the angle of inclination with which the tooth 121 is arranged on the mounting plate 103 corresponds to said angle of inclination α with respect to the perpendicular 130 to the contact surface 101, 102, which is due the mounting plate 103 being parallel to the respective contact surface 101, 102. Optionally, the tooth 121 may be configured integrally with the mounting plate 103.

This offers the advantage that the angle of inclination α can be set already when producing the pins 120. This means that a pin 120 comprising an skewed tooth 121 with a certain angle of inclination α thus automatically comprises the same angle of inclination when mounted on the bicycle pedal 100. It is therefore possible to produce pins 120 with toothings 121 with different angles of inclination α. As the pins 120 are replaceable, a user can correspondingly mount different pins 120 with different toothings 121 and different angles of inclination α. Thus, it is no longer necessary to introduce skewed threaded holes with a set angle of inclination into the pedal body 110. As the mounting plate 103 can, in addition, be placed onto the respective contact surface 101, 102 in a plane parallel manner, the user may position a screw from the top, as usual, and screw the same straight into the pedal body 110.

In this regard, reference is made again to FIG. 2. Mounting means 104, here, e.g., a screw with a Torx head, is inserted from above into a mounting opening provided for this purpose in the mounting plate 103. Below the mounting opening, the pedal body 110 comprises a threaded hole. As this threaded hole or the thread extends vertical to the contact surface 101, the screw 104 may also be screwed vertically into the pedal body 110. Thus, the user may screw the pin vertically into the pedal body 110 as usual. Positioning the screw 104 obliquely is not necessary, so that damage to the thread due to skewed insertion of the screw 104 with a wrong angle can be avoided.

In the embodiment shown here, the screw 104 can therefore be inserted into the mounting opening of the mounting plate 103 from above. Below the mounting plate 103, the pedal body 110 comprises a screw thread, into which the screw 104 can be screwed. This means that in this embodiment, the screw 104 can be screwed into the screw thread from the same contact surface 101, 102 of the pedal body 110 on which the pin 120 itself is arranged.

This may be advantageous as the screw 104 may, for example, be longer than the thickness of the pedal body 110. In the screwed-in state, the end of the screw 104 thus projects out of the contact surface 101, 102 opposite the pin 120. The end of the screw 104 can therefore act as a conventional vertical pin 140 on the opposite contact surface 101, 102.

This immediately results in an advantage regarding retrofittability of conventional pedals with the inventive pin 120. There are conventional vertical pins (not shown in the figures) having a screw head, wherein the pin comprises a thread which extends only a few millimeters from the screw head side end along the pin, i.e., only the first few millimeters comprise a thread. The remainder of the pin has a threadless design. In a conventional pedal, this type of conventional pins is screwed into the pedal from below, i.e., the conventional vertical pin is screwed through the pedal body 110 from a first contact surface 101, so that the threadless end of the pin projects out of this opposite contact surface 102. Such a conventional vertical pin may be used to mount an inventive pin 120 on the pedal.

For example, the screw 104 shown in FIG. 2 may be such a conventional vertical pin. Thus, only the mounting plate 103 of the inventive pin 120 is arranged between the conventional vertical pin (screw 104) and the contact surface 101 of the pedal 100. The conventional vertical pin (screw 104) is pushed through the mounting opening in the mounting plate 103, as described above, and screwed tight in the thread below in the pedal body 110.

This means that conventional vertical pins, which have been used to date, which are screwed through the pedal body 110, may be used in order to thus mount an inventive pin 120 on a conventional pedal. This offers a simple and absolutely user friendly possibility of retrofitting conventional pedals with the inventive pins 120.

An alternative, which is not explicitly shown here, of mounting the inventive pin 120 provides that the screw 104 is screwed into the pedal body 110 from the contact surface 102 of the pedal 100 opposite the pin 120. In this case, the pedal body 110 itself would not comprise a threaded hole, but only a simple, threadless through-hole. The exit of this through-hole is located in the area of the mounting opening of the mounting plate 103 on the contact surface 101, on which the pin 120 is mounted. A thread may be provided in the mounting opening of the mounting plate 103. The screw 104 could therefore be pushed through the through-hole from the contact surface 102 opposite the pin 120 and engage with the thread of the mounting plate 102. For this purpose, the screw 104 may naturally be slightly longer than the thickness of the pedal body 110. The inventive pin 120 could therefore be screwed in or mounted from below, i.e., from the contact surface 102 opposite the pin 120. In this embodiment, as well, the threaded hole or the thread in the mounting plate 103 may extend vertically to the contact surface 101 of the pedal body 110, so that the screw 104 can be screwed vertically into the pedal body 110.

The pedal body 110 of the inventive pedal 100 may comprise a recess 108 on the first and/or second contact surface 101, 102, in which the mounting plate 103 can be inserted in a perfectly-fitting manner. This prevents a twisting of the pin 120 while riding. Additionally, the mounting plate 103 may be flush with the surface of the respective contact surface 101, 102, in order to thus not comprise any elevations on the pedal 100 disturbing the cyclist. This means that the mounting plate 103 is recessed flush in the pedal body 110, so that only the tooth 121 of the pin 120 projects out of the respective contact surface 101, 102.

In the embodiment shown in FIG. 2, the mounting plate 103 comprises an oval contour. Additionally, the mounting plate 103 comprises a single mounting opening, though which the mounting means 104 (e.g., screw) can be pushed. Particularly in these cases, in which only a single mounting means 104 is used for mounting the pin 120, the perfectly-fitting insertion of the mounting plate 103 into the recess 108 provided therefor in the pedal body 110 offers the advantage of the mounting plate 103 not being able to twist in an undesired manner.

Figure 4B:
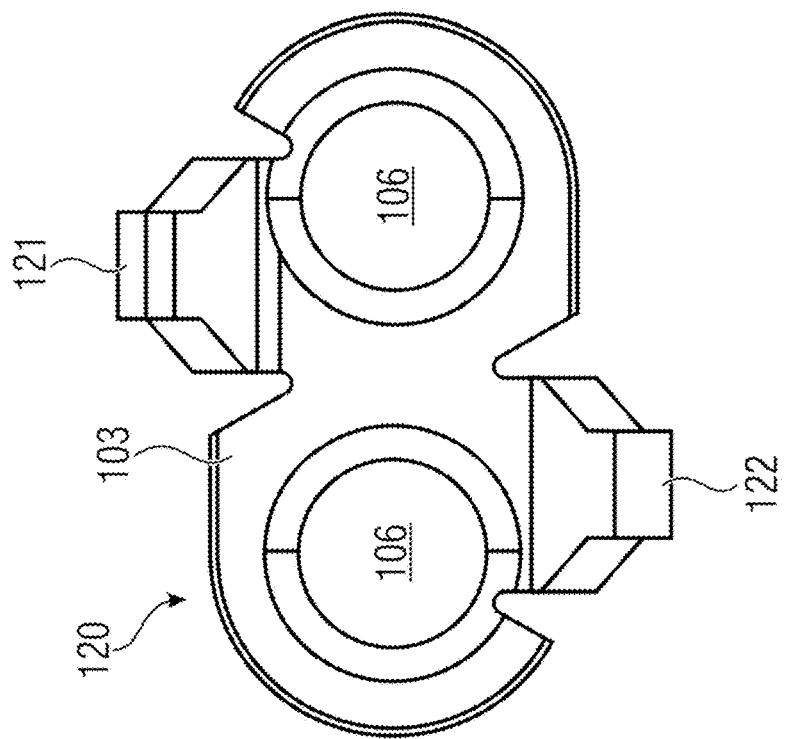
FIG. 4B shows a top view of the inventive pin of FIG. 4A.
Figure 4A:
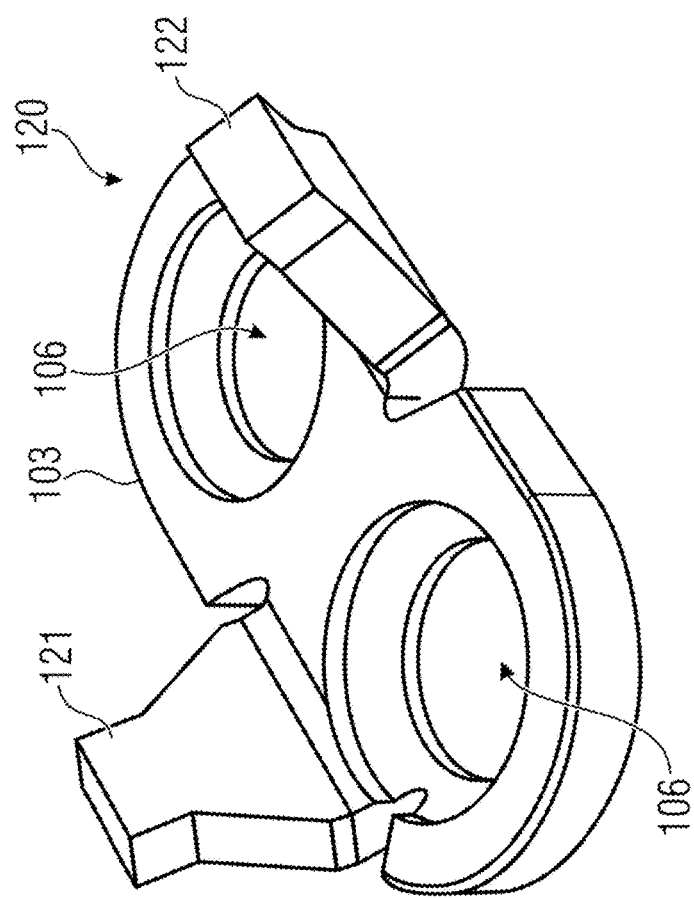
FIG. 4A shows a perspective view of an inventive pin with two skewed teeth and an oval mounting plate, according to an embodiment.

Regarding the previously mentioned mounting opening, reference is now made to the detailed views in FIGS. 4A and 4B. Here, an inventive pin 120 is depicted. It comprises a mounting plate 103. In this non-limiting embodiment, the mounting plate 103 comprises an oval contour. The mounting plate 103 also comprises two mounting opening 106. These two mounting openings 106 are arranged next to one another in the direction of extension of the oval contour. One separate mounting means 104 (e.g., screw) can be inserted or put through each mounting opening 106.

Thus, while the embodiment shown in FIG. 2 only showed a single mounting opening, the embodiment shown in FIGS. 4A and 4B comprises two mounting openings 106. This arrangement with two mounting openings 106 also allows preventing the mounting plate 103 from twisting in an undesired manner.

Furthermore, the pin 120 shown in FIGS. 4A and 4B comprises two teeth 121, 122 and, advantageously, exactly two teeth 121, 122. Each of the two teeth 121, 122 are arranged on the outer circumference of the mounting plate 103. The two teeth 121, 122 may be arranged, as shown, on opposite sides of the mounting plate 103. However, it is also conceivable that the two teeth 121, 122 are arranged on the same side of the mounting plate 103. The two teeth 121, 122 may be diagonally opposite, as is also shown here. However, it is also conceivable that the two teeth 121, 122 are directly (i.e., on a common perpendicular to the direction of extension of the oval contour) opposite.

Moreover, the two teeth 121, 122 each comprise the inventive skew with the angle of inclination of $5° \leq \alpha \leq 45°$. In the example shown here, however, the teeth 121, 122 each point in opposite directions.

Furthermore, the two teeth 121, 122 may have a mirror-symmetrical arrangement relative to one another, so that the first and the second tooth 121, 122 each have the same angle $\alpha$, with the same value but with different directions, with respect to the perpendicular 130 (see FIG. 3). This means that the two teeth 121, 122 may have the same skew or the same angle of inclination $\alpha$, as shown in FIGS. 4A and 4B, while pointing in different directions.

Here, as well, the teeth 121, 122 may be configured integrally with the mounting plate 103. For example, the mounting plate 103 may be a sheet metal molded part, which may be, e.g., punched. The two teeth 121, 122 may be configured integrally with the sheet metal molded part that also makes up the mounting plate 103 and thus also comprise the same sheet metal thickness. Here, the two teeth 121, 122 may first lie flat in the same plane as the mounting plate 103. The two teeth 121, 122 can then be bent upwards, such that they comprise the angle of inclination of $5° \leq \alpha \leq 45°$ as described herein. This naturally also applies to the pins 120 with only one single tooth 121 (FIG. 2), but also for pins 120 with more than two teeth 121, 122.

According to the embodiment depicted in FIGS. 4A and 4B, the two teeth 121, 122 thus each point in opposite directions. That is, if the depicted pin 120 is mounted on the pedal body 110, one of the two teeth 121, 122 may point forwards in the direction of travel (see arrow 133 in FIG. 3), and the respective other one of the two teeth 121, 122 may correspondingly point backwards in the direction of travel 133.

In this regard, reference is made to FIG. 2 again. This means that here, instead of the depicted pin 120 with only a single tooth 121, it would also be possible for the pin 120 with two teeth, as depicted in FIGS. 4A and 4B, to be mounted on one of the contact surfaces 101, 102 of the pedal body 110. In this case, one of the two teeth 121, 122 of the pin 120 could correspondingly point forwards in the direction of travel 133, and the respective other one of the two teeth 121, 122 of the pin 120 could point backwards.

FIG. 2 shows two inventive pins 120, each with one single tooth 121. Here, the tooth 121 of the one pin 120 points forwards in the direction of travel 133, and the tooth 121 of the respective other pin 120 points backwards in the direction of travel 133. According to this embodiment, at least one further pin 120, also comprising at least or exactly one tooth 121 with a skew with respect to the respective contact surface 101, 102 of the bicycle pedal 100, could therefore be mounted on the same contact surface 101, 102, on which the at least one pin 120 is also mounted. The skew of said tooth 121 also comprises an angle of inclination of between α=5° and α=45° with respect to the perpendicular 130 (FIG. 3) to the respective contact surface 101, 102. This means that the individual teeth 121 of both pins 120 may, for example, comprise the same angle of inclination α while pointing in opposite directions.

The pins 120 depicted in FIG. 2 may be essentially the same pins 120. As can be seen here, however, the two pins are rotated by 180° relative to one another, so that the tooth 121 of the one pin 120 points forwards, while the tooth 121 of the other pin 120 points backwards. I.e., multiple of the same pins 120 may therefore be mounted on the pedal body 110, such that the individual teeth 121 of the respective pins 120 each point in different directions.

Apart from this, everything stated above with reference to the pin 120 with one single tooth 121, depicted in FIG. 2, also applies to a pin 120 with two or more teeth 121, 122 (FIGS. 4A, 4B).

Figure 5B:
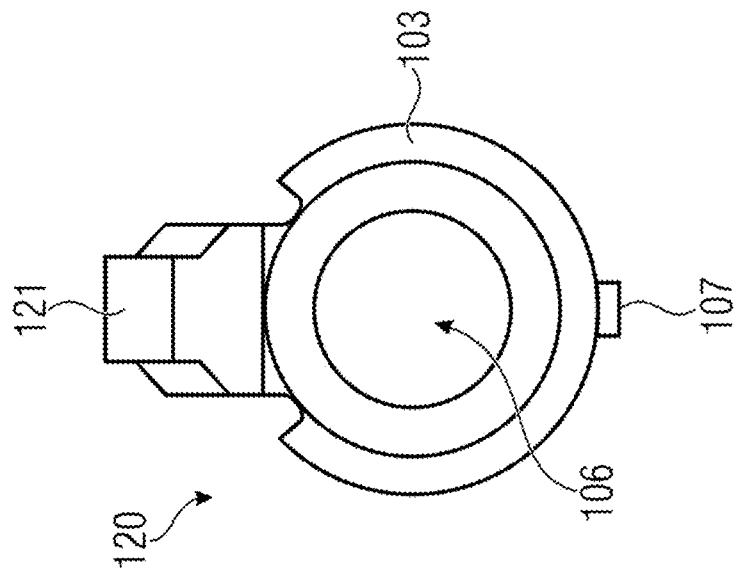
FIG. 5B shows a top view of the inventive pin of FIG. 5A.
Figure 5A:
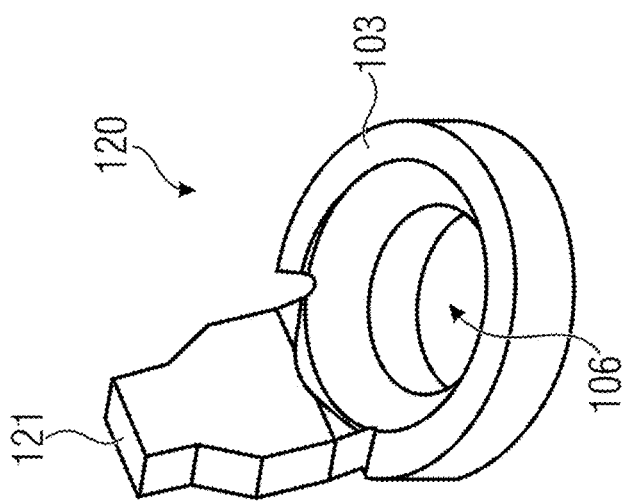
FIG. 5A shows a perspective view of an inventive pin with an skewed tooth and a circular mounting plate, according to an embodiment.

The previously discussed pins 120 comprised a mounting plate 103 with an oval contour. FIGS. 5A and 5B show an alternative embodiment of an inventive pin 120 with a mounting plate comprising a circular contour. The mounting opening 106 in this case is arranged in the center of the mounting plate 103.

The pin 120 may comprise one single tooth 121 comprising the inventive skew relative to the perpendicular 130 with the angle of inclination of between α=5° and α=45°. This pin 120, as well, may be configured as a sheet metal molded part, wherein the single tooth 121 is configured integrally with the mounting plate 103 and is bent upwards with said angle of inclination α.

The pedal body 110 may, again, comprise a recess 108 (FIG. 2) in the first and/or second contact surface 101, 102 thereof, in which recess 108 the mounting plate 103 can be inserted in a perfectly-fitting manner. In this case, the perfectly-fitting recess 108 may also comprise a circular contour. Compared to the pin 120 shown in FIG. 2, the pin 120 shown in FIGS. 5A and 5b would have the advantage that it is mountable in any position on the pedal 100 due to its circular contour, such that the single tooth 121 of the circular pin 120 may point in any desired direction.

This may be desired or undesired. For example, it may be desired that the circular pin 120 is mountable only in a specific predefined position on the pedal body 110, in which, e.g., the tooth 121 of the pin 120 is oriented either forwards or backwards in the direction of travel 133. For this purpose, e.g., the mounting plate 103 may comprise a mounting aid 107, which simplifies adjusting the pin 120 on the pedal body 110. This mounting aid 107 may be realized, e.g., in the form of a raised section protruding from the outer circumference of the mounting plate 103. This mounting aid 107, or the raised section, may be configured in the form of a spring (in the sense of a tongue-and-groove fit), which may be arranged at the outer circumference of the mounting pate 103, as it is shown merely by way of example in FIG. 5B.

Alternatively or additionally, a mounting aid may be provided in the pedal body 110. For example, the pedal body may have a geometrically fitting groove provided therein, in which the spring 107 of the mounting plate 103 can be inserted. Thus, the pin 120 can be mounted on the pedal body 110 only in a predefined position.

The mounting aid 107 is particularly advantageous in circular mounting plates 103 as the pins 120 with a circular mounting plate 103 can otherwise be mounted in any position on the pedal body 110. However, a mounting aid 107 may also be conceivable in mounting plates 103 with different or any desired geometrical shapes.

Figure 6B:
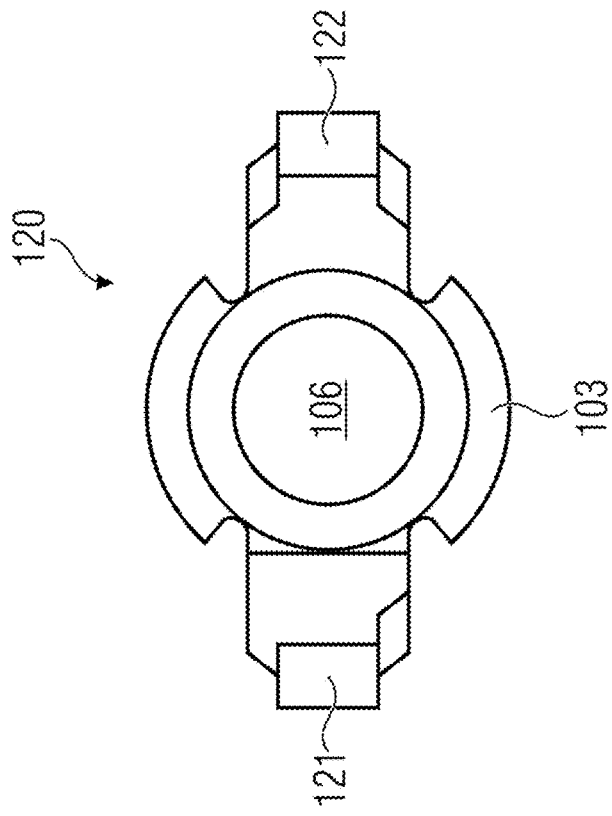
FIG. 6B shows a top view of the inventive pin of FIG. 6A.
Figure 6A:
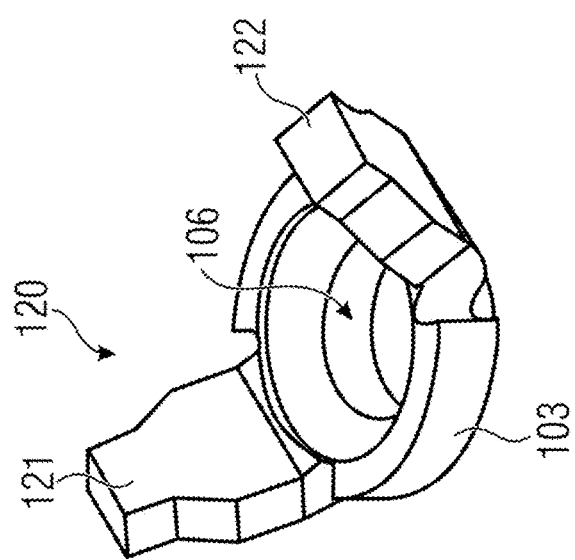
FIG. 6A shows a perspective view of an inventive pin with two skewed teeth and a circular mounting plate, according to an embodiment.

FIGS. 6A and 6B show a further embodiment of an inventive pin 120. This pin 120 is different from the other embodiments in that, among other things, this pin 120 comprises two teeth 121, 122, and, advantageously, exactly two teeth 121, 122. Apart from that, everything stated above regarding the other embodiments applies equally to these embodiments of the pin 120, as well.

In particular, both teeth 121, 122 are arranged with said skew having a the angle of inclination α of between α=5° and α=45°. Both teeth 121, 122 may be configured to be integral with the mounting plate 103. Both teeth 121, 122 may be arranged at the outer circumference of the mounting plate 103. The two teeth 121, 122 may each point in opposite directions, e.g., forwards and backwards in the direction of travel 133, respectively. Both teeth 121, 122 may be arranged mirror-symmetrically to one another.

Figure 7B:
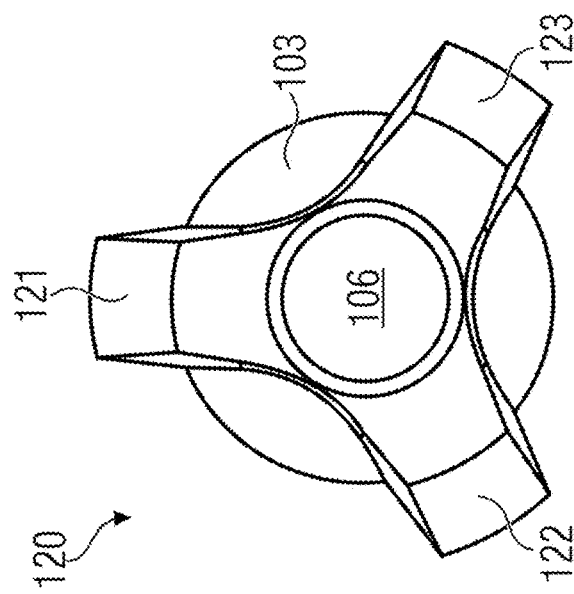
FIG. 7B shows a top view of the inventive pin of FIG. 7A.
Figure 7A:
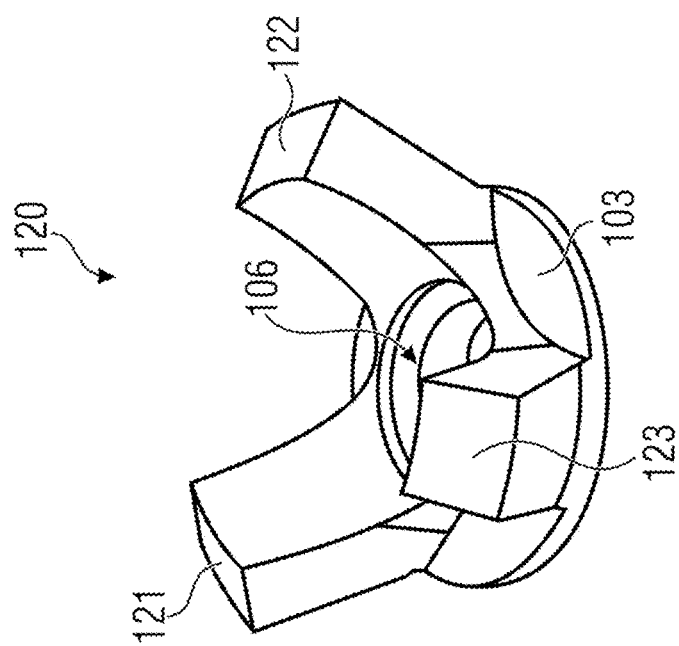
FIG. 7A shows a perspective view of an inventive pin with three skewed teeth and a circular mounting plate, according to an embodiment.

FIGS. 7A and 7B show a further embodiment of an inventive pin 120. This pin 120 is different from the other embodiments in that, among other things, this pin 120 comprises three teeth 121, 122, 123, and, advantageously, exactly three teeth 121, 122, 123. Apart from that, everything stated above regarding the other embodiments applies equally to these embodiments of the pin 120, as well.

According to this embodiment, the pin 120 thus comprises a second tooth 122 and a third tooth 123, which also each comprise a skew relative to the respective contact surface 101, 102 of the bicycle pedal 100. In this case, the skew of the second tooth 122 as well as the skew of the third tooth 123 also each comprise said angle of inclination α of between α=5° and α=45° with respect to the perpendicular 130 to the respective contact surface 101, 102.

Figure 8B:
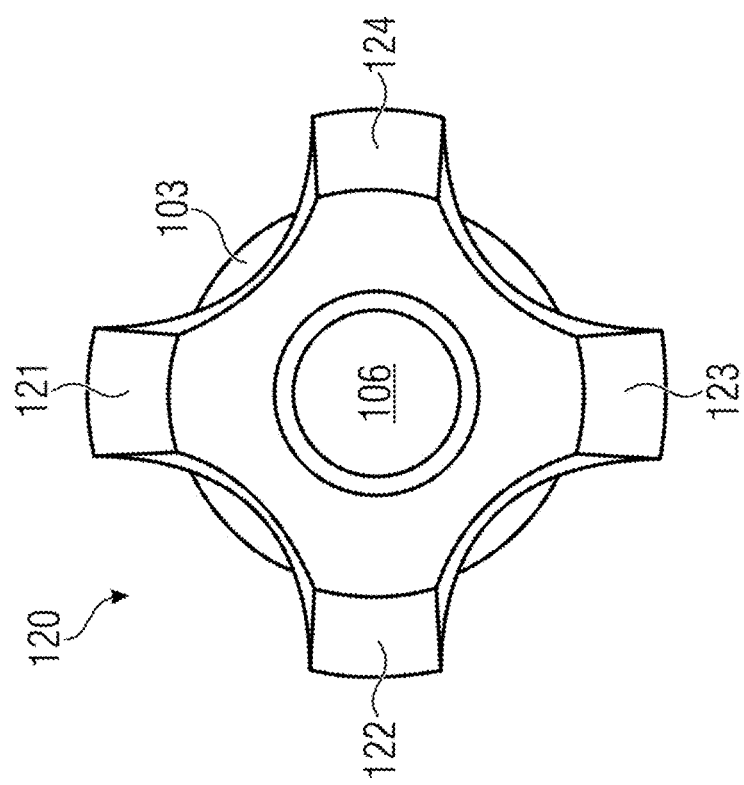
FIG. 8B shows a top view of the inventive pin of FIG. 8A.
Figure 8A:
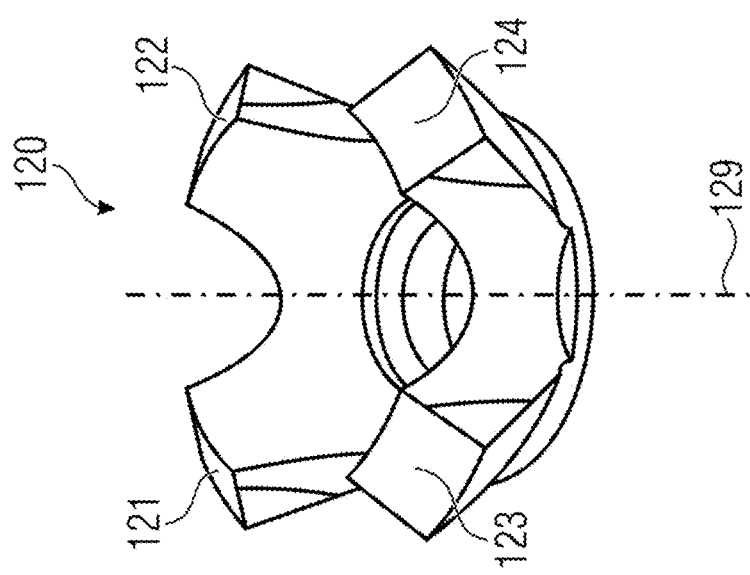
FIG. 8A shows a perspective view of an inventive pin with four skewed teeth and a circular mounting plate, according to an embodiment.

FIGS. 8A and 8B show a further embodiment of the inventive pin 120. This pin 120 is different from the other embodiments in that, among other things, this pin 120 comprises four teeth 121, 122, 123, 124 and, advantageously, exactly four teeth 121, 122, 123, 124. Apart from that, everything stated above regarding the other embodiments applies equally to these embodiments of the pin 120, as well.

According to this embodiment, the pin 120 thus comprises a second tooth 122, a third tooth 123, and a fourth tooth 124, which all also each comprise a skew relative to the respective contact surface 101, 102 of the bicycle pedal 100, wherein the respective skews of the second, third, and fourth teeth 122, 123, 124 also each comprise an angle of between α=5° and α=45° with respect to the perpendicular 130 to the respective contact surface 101, 102.

In all embodiments described herein of a pin 120 with more than one tooth, the teeth 121, 122, 123, 124 may be arranged concentrically about a common central axis 129, wherein this central axis 129 is perpendicular to the respective contact surface 101, 102 of the pedal body 110. Such a central axis 129 is depicted exemplarily in FIG. 8A.

Alternatively or additionally, the teeth 121, 122, 123, 124 may be arranged about the central axis 129 in a rotationally symmetrical manner, i.e., all teeth 121, 122, 123, 124 each have the same distance to one another. For example, FIGS. 7A and 7B show a pin 120 with three teeth 121, 122, 123, which are arranged so as to be offset from one another by 120°. FIGS. 8A and 8B show a pin 120 with four teeth 121, 122, 123, 124, which are all arranged so as to be offset from one another by 90°.

Figure 9:
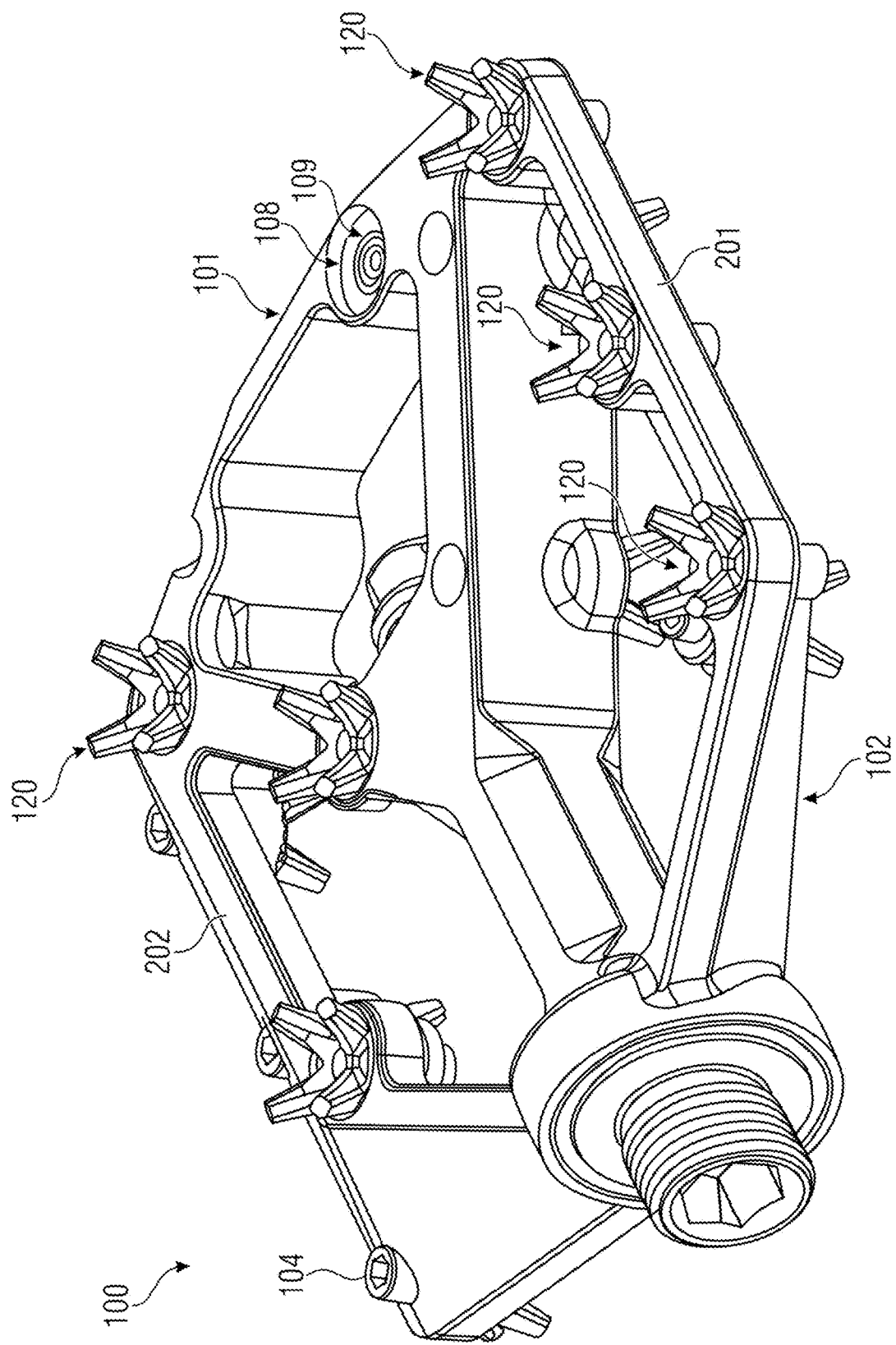
FIG. 9 shows a perspective view of a bicycle pedal with inventive pins according to an embodiment.

FIG. 9 shows a perspective view of an inventive pedal 100 with a plurality of inventive pins 120. More precisely, a plurality of pins 120 is mounted on the first contact surface 101, and there is a plurality of pins 120 also mounted on the opposite second contact surface 102. Merely by way of example, these are the pins 120 with four teeth 121, 122, 123, 124 each, as shown in FIGS. 8A and 8B.

Here, again, suitable mounting means 104 may be used for mounting the pins 120. In this non-limiting embodiment, these are hexagon socket screws or Allen screws. The hexagon socket screws 104 may be screwed, as shown in FIG. 9, from the contact surface 101, 102 opposite the pin 120 and through the pedal body 110. In this case, the mounting opening 106 (FIG. 8B) of any pin 120 may comprise a screw thread into which the screw 104 may be screwed. Below the mounting opening 106, the pedal body 110 may comprise a continuous bore, through which the mounting means 104 can be pushed. For example, a conventional vertical pin may be used as a mounting means 104 for mounting an inventive pin 120 on the pedal 100. Here, it would be conceivable that the end of the conventional pin 104 opposite the screw head projects out of the mounting opening 106 of the inventive pin 120. This means that the conventional pin 104 would project (here: centrally) out of the mounting opening 106, namely in the same direction as the four teeth 121, 122, 123, 124 of the inventive pin 120.

However, alternatively it would again be conceivable here that the mounting means 104 is screwed into the inventive pin 120 from the top. This means that the mounting means 104, e.g., a hexagon socket screw as depicted here, could be guided through the mounting opening 105 from the same contact surface 101, 102 on which the pin 120 is also arranged. In the pedal body 110, a screw thread could be provided below the mounting opening 106, into which screw thread the screw 104 can then be screwed.

In FIG. 9, such a screw thread 109 is shown, merely as an example, which is cut into the pedal body 110. The screw thread 109 is arranged below the mounting opening 106 of the pin 120. Moreover, one of the previously mentioned recesses 108 in the pedal body 110 is shown here again. The geometric shape of the recess 108 is complementary to the geometric shape of the mounting plate 103 of the pin 120, so that the pin 120 can be inserted into said recess 108 in a perfectly-fitting manner.

As mentioned in the beginning, the inventive pins 120 may be mounted on a pedal 100 together with conventional vertical pins. As the inventive pins 120 offer significantly more grip in various directions, it is advantageous of one or more inventive pins 120 are arranged on the first and/or second contact surface 101, 102, at least along the outer circumference of the pedal body 110.

For example, at least one inventive pin 120 may be arranged on the rear edge 201, as viewed in the direction of travel 133, of the pedal body 110, and/or at least one inventive pin 120 may be arranged on the front edge 202, as viewed in the direction of travel 133, of the pedal body 110.

Finally, it should be noted that an inventive pin 120 may also comprise more than the four skewed teeth 121, 122, 123, 124 described herein. Moreover, the skewed teeth may be configured both on circular and on oval mounting plates 103, regardless of their number. The mounting plate 103 may furthermore comprise any other geometric shape, e.g., rectangle, square, polygonal.

The above described embodiments are merely illustrative for the principles of the innovative concept described herein. It is understood that modifications and variations of the arrangements and the details described herein will be apparent to others skilled in the art. It is the intent, therefore, that the concept described herein be limited only by the scope of the impending patent claims and not by the specific details presented by way of description and explanation of the embodiments herein.

Although some aspects have been described in the context of an apparatus, it is clear that these aspects also represent a description of the corresponding method, where a block or device of an apparatus is also to be understood as a corresponding method step or a feature of a method step. Analogously, aspects described in the context of or as a method step also represent a description of a corresponding block or item or feature of a corresponding apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. Bicycle pedal comprising:
   a pedal body with a first contact surface and an opposite second contact surface,
   wherein a plurality of pins is arranged on the first contact surface,
   wherein a plurality of pins is arranged on the second contact surface,
   wherein at least one of the pins comprises a tooth comprising a skew relative to the respective contact surface of the bicycle pedal,
   wherein the skew of the tooth comprises an angle of between $\alpha=5°$ and $\alpha=450$ with respect to a perpendicular to the respective contact surface, on which the pin is mounted, and
   wherein the tooth protrudes obliquely or slanted from the contact surface of the pedal such that the tooth points backwards or forwards in the direction of travel when the pin is mounted on the pedal body.

2. Bicycle pedal according to claim 1,
   wherein the at least one pin comprises a mounting plate by means of which the pin can be mounted on the first or second contact surface of the pedal body, and
   wherein the tooth is arranged on the outer circumference of the mounting plate.

3. Bicycle pedal according to claim 2,
   wherein the tooth is configured integrally with the mounting plate, and
   wherein the tooth is arranged on the mounting plate with said skew with the angle of between $\alpha=5°$ and $\alpha=45°$.

4. Bicycle pedal according to claim 1,
   wherein at least one further pin is mounted on the same contact surface on which the at least one pin is also mounted, which further pin also comprises a tooth comprising a skew relative to the respective contact surface of the bicycle pedal,
   wherein the skew of this tooth also comprises an angle of between $\alpha=5°$ and $\alpha=450$ with respect to the perpendicular to the respective contact surface, and wherein the two pins are mounted on the pedal body such that the tooth of the one pin is oriented forwards in the direction of travel, and that the tooth of the other pin is oriented backwards in the direction of travel.

5. Bicycle pedal according to claim 1,
wherein the at least one pin comprises a second tooth, which also comprises a skew relative to the respective contact surface of the bicycle pedal,
wherein the skew of the second tooth also comprises an angle of between $\alpha=5°$ and $\alpha=450$ with respect to the perpendicular to the respective contact surface, and
wherein the first and the second tooth each point in opposite directions.

6. Bicycle pedal according to claim 5,
wherein the first and the second tooth are arranged mirror-symmetrically to one another, so that the first and the second tooth each comprise the same angle, with the same value but with different directions, with respect to the perpendicular.

7. Bicycle pedal according to claim 5,
wherein the at least one pin comprises a mounting plate, by means of which the pin is mountable on the first or second contact surface of the pedal body,
wherein the two teeth are each arranged on the outer circumference of the mounting plate so as to be opposite to one another,
wherein the two teeth are configured integrally with the mounting plate, and
wherein each of the two teeth is arranged on the mounting plate with said skew with the angle of between $\alpha=5°$ and $\alpha=45°$.

8. Bicycle pedal according to claim 5,
wherein one of the two teeth is oriented forwards in the direction of travel, and the respective other one of the two teeth is oriented backwards in the direction of travel,
when the pin is mounted on the pedal body.

9. Bicycle pedal according to claim 1,
wherein the at least one pin comprises at least a second tooth and a third tooth which also comprise a skew relative to the respective contact surface of the bicycle pedal,
wherein the skew of the second tooth and the skew of the third tooth also comprises an angle of between $\alpha=5°$ and $\alpha=450$ with respect to the perpendicular to the respective contact surface.

10. Bicycle pedal according to claim 9,
wherein the teeth are arranged concentrically about a common central axis, and
wherein this central axis is perpendicular to the respective contact surface of the pedal body.

11. Bicycle pedal according to claim 10,
wherein the teeth are arranged about the central axis in a rotationally symmetrical manner.

12. Bicycle pedal according to claim 9,
wherein the at least one pin comprises a mounting plate, by means of which the pin is mountable on the first or second contact surface of the pedal body,
wherein the teeth are each arranged on the outer circumference of the mounting plate,
wherein the teeth are configured integrally with the mounting plate, and
wherein each of the teeth is arranged on the mounting plate with said skew with the angle of between $\alpha=5°$ and $\alpha=45°$.

13. Bicycle pedal according to claim 9,
wherein at least one of the teeth is oriented forwards in the direction of travel, and/or at least one other one of the teeth is oriented backwards in the direction of travel,
when the pin is mounted on the pedal body.

14. Bicycle pedal according to claim 1,
wherein the pin and/or the pedal body comprises a mounting aid which allows mounting the pin on the pedal body only in a predefined position, in which the tooth is oriented forwards or backwards in the direction of travel.

15. Bicycle pedal according to claim 2,
wherein the mounting plate comprises a mounting opening, into which a separate mounting component can be inserted, by means of which the pin is mountable on the pedal body,
wherein the mounting plate comprises a circular contour, and
wherein the mounting opening is arranged in the center of the mounting plate.

16. Bicycle pedal according to claim 15,
wherein the mounting component is a screw, wherein
either the mounting opening provided in the mounting plate comprises a screw thread, and the screw can be screwed into the screw thread from the contact surface of the pedal body opposite the pin,
or wherein the pedal body comprises a bore with a screw thread below the mounting opening provided in the mounting plate, and the screw can be screwed into the screw thread from the same contact surface of the pedal body, on which the pin is also arranged.

17. Bicycle pedal according to claim 2,
wherein the mounting plate comprises two mounting openings arranged next to one another, wherein each of them may have one separate mounting component inserted therein, by means of which the pin is mountable on the pedal bod,
wherein the mounting plate comprises an oval contour, and
wherein the two mounting openings are arranged next to one another along the direction of extension of the oval.

18. Bicycle pedal according to claim 2,
wherein the pedal body comprises a recess in the first and/or second contact surface, into which the mounting plate is insertable in a perfectly-fitting manner, and
wherein the mounting plate lies flat on the respective contact surface of the bicycle pedal and is oriented in parallel with the respective contact surface.

19. Bicycle pedal according to claim 1,
wherein the at least one pin comprises at least a second tooth, a third tooth, and a fourth tooth, all of which also comprise a skew relative to the respective contact surface of the bicycle pedal,
wherein the respective skews of the second, third, and fourth teeth also comprise an angle of between $\alpha=5°$ and $\alpha=450$ with respect to the perpendicular to the respective contact surface.

20. Replaceable pin for a bicycle pedal,
wherein the pin comprises a mounting plate, by means of which the pin is mountable on a contact surface of the bicycle pedal,
wherein the pin comprises at least one tooth,
wherein the tooth is arranged on the mounting plate such that the tooth comprises a skew relative to the contact surface of the bicycle pedal when the pin is mounted on the bicycle pedal, wherein the skew of the tooth comprises an angle of between α=5° and α=45° with respect to the perpendicular to the respective contact surface of the bicycle pedal, and wherein the tooth protrudes obliquely or slanted from the contact surface of the pedal such that the tooth points backwards or forwards in the direction of travel when the pin is mounted on the pedal body.

21. The bicycle pedal of claim 1, wherein the pin is mounted with an additional screw being screwed into one of the first and second contact surfaces of the pedal body.

* * * * *